US 6,596,957 B2
Jul. 22, 2003

(12) United States Patent
Gandy et al.

(10) Patent No.: US 6,596,957 B2
(45) Date of Patent: Jul. 22, 2003

(54) METHOD AND APPARATUS AND PREFABRICATED REPLACEMENT TUBE FOR LOCALIZED WATERWALL REPAIR

(75) Inventors: David Wayne Gandy, Concord, NC (US); James William Hales, Harrison, TN (US); William Frederick Newell, Jr., Mooresville, NC (US); Kent K. Coleman, Concord, NC (US); Gregory J. Frederick, Harrisburg, NC (US); Richard M. Tilley, Harrisburg, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 09/991,216

(22) Filed: Nov. 16, 2001

(65) Prior Publication Data

US 2003/0094440 A1 May 22, 2003

(51) Int. Cl.$^7$ .................. B23K 31/02; B23K 9/028; B23P 6/00
(52) U.S. Cl. .................. 219/61; 219/125.11; 228/119; 29/890.031
(58) Field of Search .................. 219/61, 125.11, 219/137 R; 228/119; 29/890.031

(56) References Cited

U.S. PATENT DOCUMENTS

| | | | |
|---|---|---|---|
| 4,047,659 A | 9/1977 | Vucic | |
| 4,844,322 A | 7/1989 | Flowers et al. | |
| 4,872,249 A | 10/1989 | VanderPol et al. | |
| 4,979,294 A | * 12/1990 | Bowman et al. ....... | 29/890.031 |
| 5,193,257 A | 3/1993 | Bowman et al. | |
| 5,542,177 A | 8/1996 | Hillestad | |
| 6,230,072 B1 | 5/2001 | Powell et al. | |

FOREIGN PATENT DOCUMENTS

JP          8-281468          * 10/1996          ........... B23K/31/00

* cited by examiner

*Primary Examiner*—M. Alexandra Elve
*Assistant Examiner*—Kevin P. Kerns
(74) *Attorney, Agent, or Firm*—Dorsey & Whitney LLP (57) ABSTRACT

A method, an apparatus (150), and a prefabricated replacement tube (108) are provided for repairing a defect (112) in a tube (102), such as in a waterwall (100). In the method, a replacement tube (108) is prefabricated having a wall (116), a central opening (114) extending through a portion thereof, and a predetermined length. A length of the tube (102), including the defect (112), equal to the predetermined length is removed. The replacement tube (108) is positioned between stubs (126, 128) of the tube (102), and a rotatable torch (152) of an automated welding apparatus (150) inserted through the opening (114) to align with a joint between an end (118, 120) of the replacement tube and a stub (126, 128). The torch (152) is rotated to join it to the stub (126, 128) along the entire joint. The torch (152) is then removed, turned 180 degrees, and reinserted to weld the remaining joint. Optionally, the replacement tube (108) is held in position before welding by slip rings (140, 142) which are slid down to cover the joints.

30 Claims, 5 Drawing Sheets

METHOD AND APPARATUS AND PREFABRICATED REPLACEMENT TUBE FOR LOCALIZED WATERWALL REPAIR

FIELD OF THE INVENTION

The present invention relates generally to a method and apparatus for repairing a defective tube, and more particularly to a method, apparatus, and prefabricated replacement tube for partial tube replacement in a heat exchanger to which access is restricted.

BACKGROUND OF THE INVENTION

Various types of heat exchangers, such as boilers and waterwalls, are commonly used in hoods and stacks for cooling and/or treating industrial exhaust, for example from steelmaking furnaces, and by utilities (electric companies) to produce electrical energy and/or to cool power generating equipment.

One problem with the operation of heat exchangers is that the heat, gases, dust and substances or fluids to which they are exposed frequently leads to increased rates of corrosion resulting in damage or defects in the tubes of the heat exchanger and subsequent leakage.

A conventional approach to repairing the heat exchanger is to remove a section of the damaged tube, including the defect, over some length, and to install a new replacement tube in its place. The ends of the replacement tube and the stubs of the existing tube are prepared for welding by fitting and beveling surfaces at which they will be joined. Typically, the joining is done manually using shielded metal arc welding (SMAW).

One problem with this approach is that because the weld is performed completely from the outer diameter (OD) of the tube, access is required to all sides of the tube, which is not possible for all heat exchanger designs, particularly boilers such as waterwalls. For example, tubes in a waterwall are frequently connected together along the length of their sides by a metal-webbing or membrane to give added rigidity and strength to the waterwall. Moreover, the waterwall is usually positioned abutting or in close proximity to an outer wall of the boiler (the cold-side). Thus, access is limited to more than half of the outer surface of the tube. This limited accessibility makes it difficult for the welder to achieve good weld tie-in/penetration and often results in less than desirable weld quality and may create problems in the future.

Yet another problem with the above tube replacement method is manual welds performed from the OD are prone to weld defects such as reinforcement or excessive build-up of material on the inner diameter (ID) that lead to restricted fluid flow and accelerated corrosion or erosion at the weld locations.

Another generally known approach for partial replacement of a tube in a heat exchanger, which avoids some of the problems of the above approach, is described, for example, in U.S. Pat. No. 4,047,659, to Vucic (VUCIC). VUCIC discloses accessing the ID of the tube by cutting windows at each end of the replacement tube, the windows intersecting the ends of the replacement tube, and manually welding a portion of the attachment weld from the ID through the window. Covers for the windows are fabricated and welded over the windows from the OD completing the repair.

While a significant improvement over the above approach, this approach is also not wholly satisfactory. A major shortcoming of the approach disclosed in VUCIC is the time required for measuring the section cut from the tube to be repaired, cutting a replacement tube to the correct length, cutting out the windows, preparing the ends of the replacement tube for welding, fabricating covers for the windows and welding the covers over the windows. Another problem with the approach in VUCIC is that all welds are performed manually using a SMAW process. Since the SMAW welds are full penetration, i.e., through the entire thickness of the tube, build-up on the ID for that portion of the welding done from the OD, such as the window covers, can still be a problem. Moreover, because the welds are performed manually weld quality is inconsistent, not-reproducible and can vary from weld to weld.

Accordingly, there is a need for a method and apparatus for repairing a defective tube that provides a weld quality similar to that of a new installation or original fabrication. It is desirable that the method and apparatus eliminate excessive buildup of material from the ID of the repaired tube that can disrupt or reduce fluid flow through the repaired tube and lead to increased erosion/corrosion at the joints. It is also desirable that the method and apparatus enable repairs to be completed quickly with a minimum amount of down time for the heat exchanger. It is further desirable that the method and apparatus be automatic to reduce the level of skilled labor needed.

The present invention provides a solution to these and other problems, and offers other advantages over the prior art.

SUMMARY OF THE INVENTION

It is an object of the present invention to provide a method, apparatus and prefabricated replacement tube for partial tube replacement in a heat exchanger to which access is restricted.

According to one aspect, the present invention provides a method for repairing a defect in a tube using an apparatus including a rotatable torch assembly, a wire feeder for supplying wire to the rotatable torch assembly, and a rotational drive assembly for supporting and rotating the rotatable torch assembly. Generally, the method involves steps of: (i) removing a section of the tube having the defect therein; (ii) fabricating a replacement tube having a wall with an opening extending through a portion thereof, and first and second ends prepared for joining to stubs of the tube formed by removal of the section of the tube having the defect therein; (iii) positioning the replacement tube between the stubs of the tube; (iv) inserting the rotatable torch assembly into the replacement tube through the opening, the rotatable torch assembly configured to align with a joint between the first end of the replacement tube and a stub; and (v) joining the first end of the replacement tube to the stub entirely along a joint therewith by rotating the rotatable torch assembly within the replacement tube. Optionally, slip rings in sliding engagement with the outer surface of the replacement tube hold it in position before it is joined to the stubs. In this embodiment, following the positioning of the replacement tube between the stubs, the slip rings slide up or down to cover the joints. The slip rings have the further advantage of serving as backing rings strengthening the joint when the replacement tube is joined to the stubs, typically by welding.

In one embodiment, the replacement tube is prefabricated having a first end and a second end separated by a predetermined length, and the step of removing a section of the tube having the defect therein involves removing a length of the tube substantially equal to the predetermined length of the prefabricated replacement tube.

In another embodiment, the opening is centrally located between the first and second ends, and the method further includes the steps of: (i) removing the rotatable torch assembly from the opening; (ii) reorienting the rotatable torch assembly; (iii) re-inserting the rotatable torch assembly into the replacement tube through the opening, the rotatable torch assembly configured to align with a joint between the second end of the replacement tube and another one of the stubs; and (iv) joining the second end of the replacement tube to one of the stubs substantially entirely along or around a joint formed there between by rotating the rotatable torch assembly within the replacement tube. The repair of the tube is completed by removing the rotatable torch assembly from the opening, and sealing the opening with a prefabricated cover. Typically, the cover is cover-welded or welded to the opening.

As noted above, the replacement tube is joined to the stubs by welding. Preferably, the replacement tube is joined to the stubs by butt-welding or welding the first and second ends of the replacement tube to the stubs using the rotatable torch assembly. In one version of this embodiment, the apparatus is a Gas Metal Arc Welding (GMAW) apparatus, or a Gas Tungsten Arc Welding (GTAW) apparatus, and the step of welding includes providing a shield gas to the rotatable torch assembly through a rotatable coupling in the rotational drive assembly.

Whichever method for joining is used, preferably, the apparatus further includes a controller for controlling power supplied to the rotatable torch assembly, and operating the rotational drive assembly, and the step of joining the replacement tube to the stubs is performed automatically once the torch is aligned with a joint. The controller controls or adjusts power supplied to the rotatable torch assembly and operates the rotational drive assembly to rotate the torch at a speed that substantially eliminates an excessive build up of material on the inner diameter (ID) of the tube at the joint. Thus, restriction in fluid flow through the repaired tube and corrosion of the joint is reduced.

In another aspect, the present invention is directed to an apparatus for joining a replacement tube to stubs of a tube from which a section of the tube having a defect therein has been removed. The apparatus includes a rotatable torch assembly capable of being inserted into the replacement tube through a window in the replacement tube, to join first and second ends of the replacement tube to the stubs. Wire for joining the replacement tube to the stubs is fed to the rotatable torch assembly by a wire feeder having a wire drive assembly and a wire supply. A rotational drive assembly supports the rotatable torch assembly and rotates it within the replacement tube to join the first and second ends of the replacement tube to the stubs substantially entirely along joints therewith. Generally, the apparatus according further includes a mount to which the rotational drive assembly and the wire feeder are attached, and a latching mechanism for securing the mount to position the rotatable torch assembly within the replacement tube. In one embodiment, the latching mechanism is adapted to be partially inserted into the window to secure the mount to the replacement tube.

In one embodiment, the window in the replacement tube is a centralized window centrally located between the first and the second ends. The rotatable torch assembly is adapted to be inserted into the replacement tube through the centralized window to align with the joint between the first end of the replacement tube and one of the stubs to join the first end to the stub, and to be removed from the replacement tube, reoriented, and reinserted through the centralized window to align with and join the second end to the other stub.

Alternatively, the replacement tube has a number of windows including: (i) a first window located a predetermined distance from the first end of the replacement tube and through which the rotatable torch assembly can be inserted into the replacement tube to join the first end of the replacement tube to one of the stubs; and (ii) a second window located the same predetermined distance from the second end of the replacement tube and through which the rotatable torch assembly can be inserted into the replacement tube to join the second end of the replacement tube to one of the stubs.

In another embodiment, the rotatable torch assembly is adapted to weld the first and second ends of the replacement tube to the stubs. In one version of this embodiment, the apparatus is a gas metal arc welding apparatus (GMAW), and the rotational drive assembly further includes a rotatable coupling through which shield gas is supplied to the rotatable torch assembly. The rotational drive assembly is adapted to rotate the rotatable torch assembly at predetermined rate based on power supplied to the rotatable torch assembly and materials of the wire, the replacement tube and the tube.

In still another embodiment, the apparatus further includes a controller for automatically supplying power to the rotatable torch assembly, and operating the rotational drive assembly. The controller controls or adjusts power supplied to the rotatable torch assembly and operates the rotational drive assembly to rotate the torch at a speed that substantially eliminates a build up of material on the inner diameter (ID) of the tube at the joint. Thus, restriction in fluid flow through the repaired tube and corrosion of the joint is reduced.

In yet another aspect, the present invention is directed to a prefabricated replacement tube for use in repairing a tube having a defect therein. Generally, the replacement tube has a wall with a central opening extending through a portion thereof, and first and second ends separated by a predetermined length. The ends are prepared for joining to stubs of the tube from which a section of the tube having the defect therein has been removed. The central opening is centrally located between the ends, and adapted to enable a rotatable torch to be inserted into the replacement tube through the central opening to join the ends of the replacement tube to the stubs.

Preferably, the central opening is adapted to accommodate the rotatable torch of an automated gas metal arc welding apparatus, which is inserted into the replacement tube to weld the ends thereof to the stubs of the tube substantially without a build up of material at joints. More preferably, the central opening is also adapted to enable an automated welding apparatus to weld a prefabricated cover over the central opening, thereby completing repair of the tube.

Optionally, the prefabricated replacement tube further includes at least one slip ring in sliding engagement with an outer surface of the wall to maintain the replacement tube in alignment with the stub while it is joined to the stubs. The slip ring is adapted to be positioned over the joint between one of the ends of replacement tube and one of the stubs.

Advantages of the method, apparatus and prefabricated replacement tube of the present invention include any one or all of the following:
 (i) a weld quality similar to that of a new installation or original fabrication;
 (ii) welding is performed from the inner diameter (ID) eliminating excessive buildup or reinforcement typical of outer diameter (OD) welding processes, which can disrupt or reduce fluid flow through the repaired tube and lead to increased erosion/corrosion at the joints;

(iii) weld quality is reproducible and consistent compared to manual applications;

(iv) weld defects associated with manual repair methods are eliminated;

(v) repair is completed entirely from one side of the tubing, for example, fire-side of a waterwall, eliminating access problems associated with welding from both sides; and (vi) prefabricated replacement tubes having standardized lengths and window configurations can be made available on demand or stocked on site eliminating delays for fabricating replacement tubes.

BRIEF DESCRIPTION OF THE DRAWINGS

These and various other features and advantages of the present invention will be apparent upon reading of the following detailed description in conjunction with the accompanying drawings, where.

DETAILED DESCRIPTION OF THE INVENTION

The present invention is directed to a method, apparatus, and prefabricated replacement tube for partial tube replacement in a heat exchanger to which access is restricted.

In general, the method involves the steps of: (i) providing a prefabricated repair or replacement tube having a wall with an opening extending through a portion thereof, and first and second ends separated by a predetermined length and prepared for joining to stubs of a tube formed by removal of a section of the tube having a defect therein; (ii) removing the section of tube with the defect, the section having a length substantially equal to the predetermined length of the replacement tube; (iii) inserting a rotatable torch assembly of the apparatus into the replacement tube through the opening to align with a joint between the first end of the replacement tube and a stub; (iv) joining one end of the replacement tube to the stub entirely along a joint therewith by rotating the rotatable torch assembly within the replacement tube; and (v) removing, reorienting and reinserting the rotatable torch assembly to join the remaining end of the replacement tube to the remaining stub. Preferably, the opening is centrally located between the first and second ends. More preferably, the opening and the rotatable torch assembly are configured to enable the rotatable torch assembly to align correctly with either end of the replacement tube, thereby enabling the joining process to be automated. The repair of the tube is completed by removing the rotatable torch assembly from the opening, and sealing the opening with a prefabricated cover.

Heat exchangers generally include a number of tubes through which a heat transfer fluid is passed. Usually, the tubes are cylindrically shaped with a diameter much less than their length, and have open ends that are sealed or coupled to a larger tube or plenum (not shown) through which the heat transfer fluid is passed. The heat transfer fluid can include a gas, such as air, nitrogen, helium, argon and carbon dioxide, a liquid, such as water, deionized water, distilled water, oil, alcohol, ethylene glycol, or a liquid metal, such as sodium. To increase the efficiency of thermal transfer the heat transfer fluid may be contained within a closed pressurized system of which the heat exchanger is but one component.

Figure 1:
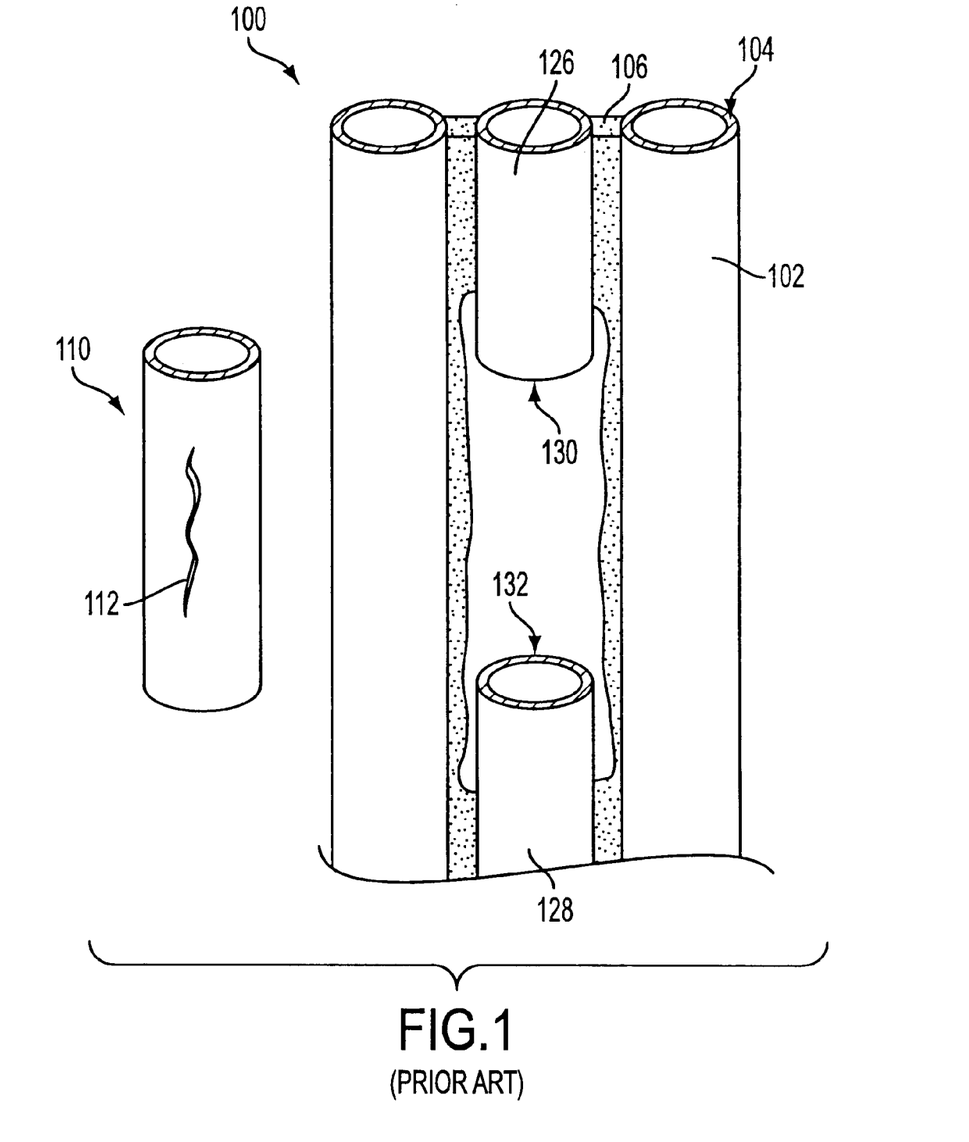
FIG. 1 (prior art) is a perspective view of a portion of a waterwall for which a method and apparatus according to an embodiment of the present invention is particularly useful.

FIG. 1 is a perspective view of a portion of a particular type of heat exchanger, a waterwall 100, for which a method and apparatus (not shown in this figure) according to an embodiment of the present invention is particularly useful. Waterwalls 100 are commonly used in, for example, gas, oil and coal-fired boilers (not shown) of electric power or utility plants. For purposes of clarity, many of the details of waterwalls 100 that are widely known-and are not relevant to the present invention have been omitted. Referring to FIG. 1, a waterwall 100 typically includes a number of parallel tubes 102 through which a heat transfer fluid is passed. As fuel is burned in a boiler's interior, heat is transferred into the waterwall 100 to heat water contained therein and produce steam to turn a turbine and generate electricity. Optionally, the heat transfer fluid in the waterwall 100 is pressurized to raise the boiling point, reducing or eliminating boiling, and the heated heat transfer fluid, water, is coupled to a second heat exchanger, a steam generator (not shown), in which water heated by the heat transfer fluid is boiled to produce steam. This embodiment has the advantage of enabling use of heat transfer fluids having greater heat transfer capacities or corrosion inhibiting properties. It should be noted that in this embodiment the method and apparatus of the present invention can be used to repair defective tubes 102 in both the waterwall 100 and the steam generator.

Because the tubes 102 of the waterwall 100 have thin walls 104 relative to their cross-section, they are often joined to one another along the sides thereof by a mesh or webbing 106 to improve the strength of the waterwall. To improve heat transfer, strength and tolerance to elevated temperatures the tubes 102 and the webbing 106 are made of a metal, such as steel, copper, zinc, nickel and/or alloys thereof. As noted above, the tubes 102 are cylindrically shaped having a diameter much less than their length, and open ends that are sealed or coupled to a larger tube or plenum (not shown) through which the heat transfer fluid is passed. For example, a typical waterwall used a utility plant can include over 1,000 tubes, each having a length of up to 200 meters, and a diameter of from 2 to 10 centimeters.

Figure 2:
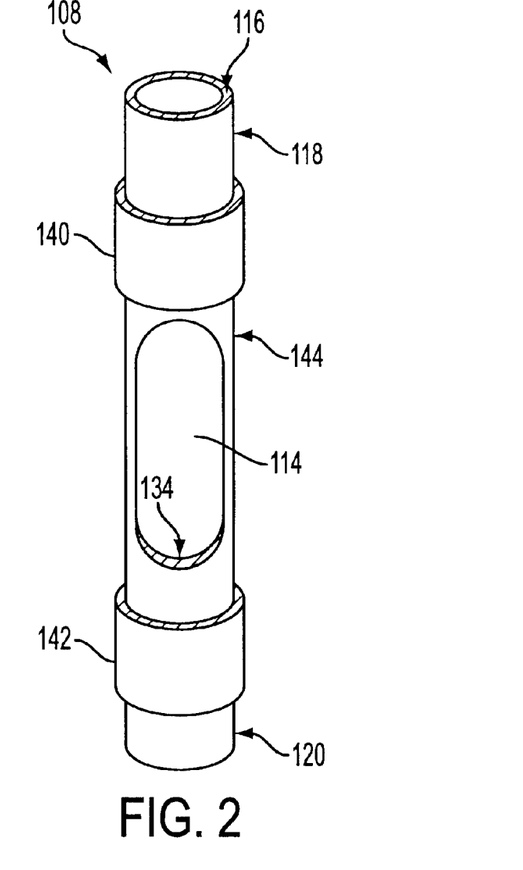
FIG. 2 is a perspective view of a prefabricated replacement tube having a central opening or window according to an embodiment of the present invention.

An embodiment according to the present invention of a replacement tube 108 for repairing a tube 102 in a waterwall 100 from which a section 110 having a damage or defect 112 therein will now be described with reference to FIGS. 1, 2 and 3. FIG. 2 is a perspective view of a prefabricated replacement tube 108 having a window or opening 114 according to an embodiment of the present invention. Generally, the replacement tube 108 has a cylindrical wall 116 with a diameter or radius substantially the same as that of a tube 102 in the waterwall 100, an opening 114 extending through a portion of the wall, and first and second ends 118, 120, separated by a predetermined length. Preferably, for reasons described below, the opening 114 is a central opening centrally located between the first and second ends 118, 120. The opening 114 is sized and shaped to accommodate a rotatable torch assembly (not shown in this figure) of the apparatus of the present invention. In the embodiment shown, the opening 114 has an oval shape with a long axis parallel with that of the replacement tube 108. By predetermined length it is meant any one of several lengths ranging from a length little longer than that of the opening to a length nearly equal to that of a tube in a waterwall for which it is prefabricated as a replacement tube. In a preferred embodiment of the method a number of prefabricated replacement tubes 108 having diameters equal to those of tubes in a waterwall and various predetermined lengths are maintained in inventory near where they are to be used to expedite the repair process and minimize downtime of the waterwall.

Edges of the first and second ends 118, 120, are prepared for joining to stubs 126, 128, formed by removal of the damaged section 110 of the tube 102 in the waterwall 100 having the defect 112 therein. For example, the edges of the first and second ends 118, 120, can be beveled to self-align and fit flush with edges 130, 132, of the stubs 126, 128, which are beveled or slanted in a complementary direction when the replacement tube 108 is positioned between the stubs. Similarly, an edge 134, or edges, surrounding and defining the opening 114 can be prepared or beveled for joining to an edge, or edges, of a prefabricated cover 138, described in detail below.

The replacement tube 108 can be joined to the stubs 126, 128, by soldering, brazing or welding. Preferably, the replacement tube 108 is joined to the stubs 126, 128, using a Gas Metal Arc Welding (GMAW) process. Alternatively, the replacement tube 108 is joined to the stubs 126, 128, by a butt-weld using a Gas Tungsten Arc Welding (GTAW) process that penetrates the full thickness of the wall 116 of the replacement tube and tube 102 undergoing repair.

It will be appreciated, that the replacement tube 108 need not be made from the same metal or material as the tubes 102 of the waterwall 100 it is used to repair. Rather, the replacement tube 108 can be made from a metal or material selected to facilitate joining with the stubs 126, 128, of the tube 102, or of a material that is resistant to corrosion, and electrochemical corrosion, and is suitable for use in a wide range of environments or applications. For example, high-temperature nickel alloys, stainless-steel, or other steel alloys. Preferably, the metal or material of the replacement tube 108 has a coefficient of thermal expansion similar to that of the metal or material of tubes 102 in the waterwall 100. More preferably, the material of the replacement tube 108 also has corrosion properties similar to that of the metal or material of tubes 102 in the waterwall 100.

Optionally, the replacement tube 108 further includes one or more slip rings 140, 142, in sliding engagement with an outer surface 144 of the wall 116 of the replacement tube. The slip rings 140, 142, are configured to be positioned over joints formed between the first and second ends 118, 120, of the replacement tube 108 and the stubs 126, 128, thereby maintaining the replacement tube in alignment or position between the stubs prior to the replacement tube being joined to the stubs. In addition, in a preferred embodiment wherein the replacement tube 108 is joined to the stubs 126, 128, by a weld fully penetrating thicknesses of the replacement tube and the stubs, the slip rings 140, 142.

Figure 3:
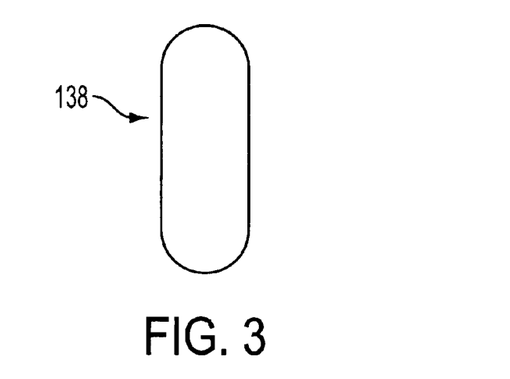
FIG. 3 is a perspective view of a prefabricated cover for the central opening in the prefabricated replacement tube of FIG. 2 according to an embodiment of the present invention.

FIG. 3 is a perspective view of a prefabricated cover 138 for the opening 114 in the prefabricated replacement tube 108 of FIG. 2. Generally, the cover 138 has a size and shape substantially the same as those of the opening 114 and an edge (not shown) prepared for joining to the edge 134 of the opening 114. For example, the edge of the cover 138 can be beveled to fit flush with the edge 134 of the opening 114. In one embodiment, the cover 138 is a piece of the wall 116 of the replacement tube 108 cut from the replacement tube. Alternatively, the cover 138 can be prefabricated from a separate tube or piece of metal having an inner and/or an outer surface with a radius similar to that of the replacement tube. The prefabricated cover 138 need not be made from the same metal or material as the replacement tube 108 or the tube 102 being repaired. Rather, the cover 138 can be made from a metal or material selected to facilitate sealing the opening 114 therewith. Preferably, the material of the cover 138, if made from a separate tube or piece of metal, has a coefficient of thermal expansion similar to that of the metal or material of the replacement tube 108. More preferably, the material of the cover 138 also has corrosion properties similar to those of the metal or material of the replacement tube and the tube being repaired. The cover 138 can be cover-welded or welded over or into the opening 114.

Figure 4:
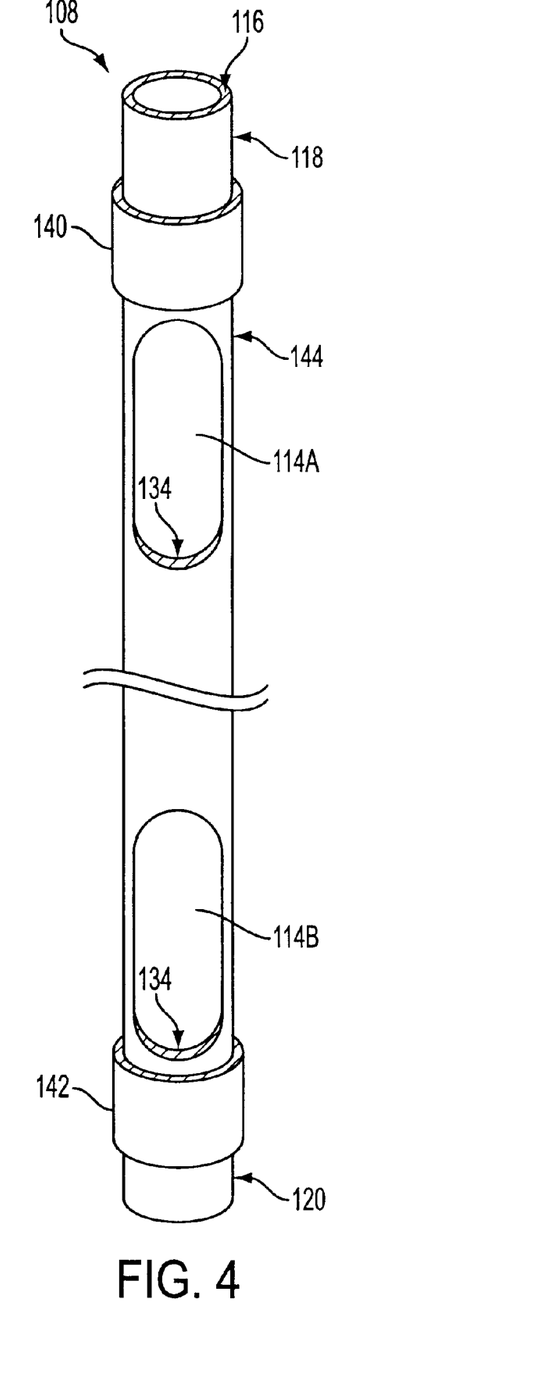
FIG. 4 is a perspective view of an alternative embodiment of a prefabricated replacement tube having a multiple openings or windows according to an embodiment of the present invention.

An alternative embodiment of a prefabricated replacement tube 108 having multiple openings or windows through which the rotatable torch assembly (not shown in this figure) can be inserted into the replacement tube. The windows, include a first window 114A located a first predetermined distance from the first end 118 of the replacement tube 108, and a second window 114B located a second predetermined distance from the second end of the replacement tube. Generally, the first window 114A is sized, shaped and located so that the rotatable torch assembly can be inserted into the replacement tube 108 to join the first end 118 of the replacement tube to one of the stubs 126, and the second window 114B is sized, shaped and located so that the rotatable torch assembly can be inserted into the replacement tube to join the second end 120 of the replacement tube to the other stub 128. Preferably, the first predetermined distance from the first window 114A and the first end 118 of the replacement tube 108, and the second predetermined distance from the second window 114B and the second end 120 of the replacement tube are substantially the same. This embodiment particularly useful for relatively long replacement tubes 108 for which a centralized window 114 would result in an impractically long rotatable torch assembly. This embodiment is also useful for situations in which the rotatable torch assembly must be kept relatively short. For example, in repairing boilers or waterwalls 100 to which access is severely limited.

An embodiment of an apparatus according to the present invention for repairing a tube 102 in a waterwall 100 will now be described with reference to FIGS. 5 through 8.

Figure 5:
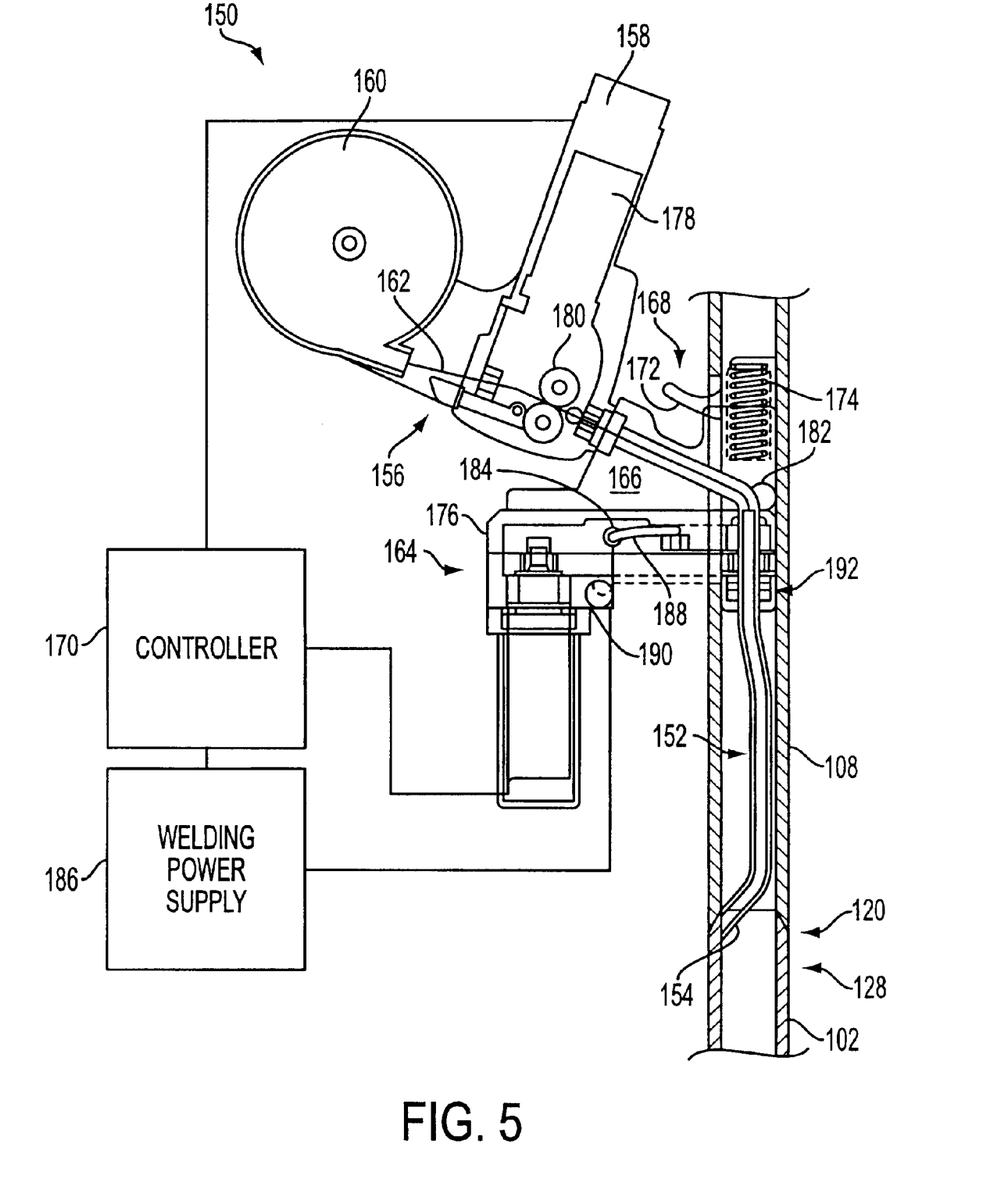
FIG. 5 is a sectional side view of an apparatus for welding a replacement tube to a tube from which a section of damaged tube has been removed according to an embodiment of the present invention.

FIG. 5 is a sectional side view of an apparatus 150 according to an embodiment of the present invention for welding a replacement tube 108 to stubs 126, 128, of a tube 102 from which a damaged or defective section 110 has been removed. Generally, the apparatus 150 includes: (i) a rotatable torch assembly 152 configured to be inserted into the replacement tube 108 through the opening 114 and to weld the first and second ends 118, 120, of the replacement tube 108 to the stubs 126, 128; (ii) a wirefeed mechanism or wire feeder 156 having a wire drive assembly 158 and a wire supply 160 configured to feed filler wire or wire 162, such as welding wire, to the rotatable torch assembly 152 to join first and second ends 118, 120, of the replacement tube 108 to the stubs 126,128; (iii) a rotational drive assembly 164 supports the rotatable torch assembly 152 and rotates it within the replacement tube 108 to join the first and second ends 118, 120, of the replacement tube to the stubs 126,128, substantially entirely along joints formed therewith; (iv) a mount 166 to which the rotational drive assembly 164 and the wire feeder 156 are attached; and (v) a latching mechanism 168 for securing the mount 166 to position the rotatable torch assembly 152 within the replacement tube 108.

Optionally, the apparatus 150 further includes a controller 170 that can be operated or programmed to automatically provide power and filler wire 162 to the rotatable torch assembly 152, and to control the rotational drive assembly 164, thereby providing a uniform and defect-free joint between the first and second ends 118, 120, and the stubs 126, 128. In addition, performing the joining process from inside the replacement tube 108 and automating the process, substantially eliminates build up of material at joints between the replacement tube and tube 102, thereby reducing restriction in fluid flow through the tube and corrosion/erosion of the joints after the tube has been repaired.

The latching mechanism 168 can include any suitable means for temporarily attaching the mount 166 to the replacement tube 108 and/or the tube 102 undergoing repair. In a preferred embodiment, the latching mechanism 168 is adapted to be partially inserted into the opening 114 to secure the mount 166 to the replacement tube 108. In a preferred embodiment, the latching mechanism 168 is integrally formed with the mount 166. That is, a portion of the mount 166 is also part of the latching mechanism 168 that is inserted into the opening 114. In one version of this embodiment, as shown, the latching mechanism 168 further includes a latch-and-release trigger 172 and a spring 174 that forces the trigger against one end or edge of the opening 114, and, through the mount 166 and a housing frame 176, forces the rotational drive assembly 164 against the opposing or facing end or edge.

Typically, the wire feeder 156 includes an electric motor 178 driving one or more gears or drive rollers 180 that engage the filler wire 162 forcing it through a wire conduit 182 to the rotatable torch assembly 152. The wire feeder 156 can be operated manually by an operator controlling power to the electric motor 178, or automatically by the controller 170 to synchronize feeding of the filler wire 162 to the rotation of the rotatable torch assembly 152.

In a preferred embodiment, the apparatus 150 is a welding apparatus and the rotatable torch assembly 152 is adapted to weld or butt-weld the first and second ends 118, 120, of the replacement tube 108 to the stubs 126, 128. For purposes of clarity, many of the details of welding systems that are widely known and are not relevant to the present invention have been omitted. Generally, in this embodiment the apparatus 150 includes a power input terminal 184 to which power from a welding power supply 186 is applied, and a lead 188 electrically coupling the terminal to the tip 154 of the rotatable torch assembly 152. The electrical coupling is accomplished using a power brush and a rotating contact ring in the rotational drive assembly 164, described in greater detail below. Welding is accomplished using the concentrated heat from an electric arc formed between the welding wire 162 and the replacement tube 108 and/or the tube 102 being repaired, which is electrically connected by a ground cable (not shown) to the welding power supply 186.

In a preferred embodiment, the apparatus 150 is a Gas Metal Arc Welding (GMAW) apparatus or a Gas Tungsten Arc Welding (GTAW) apparatus, and the rotational drive assembly 164 further includes a gas inlet 190 and a rotatable coupling 192 through which shield gas is supplied to the rotatable torch assembly 152.

Figure 6:
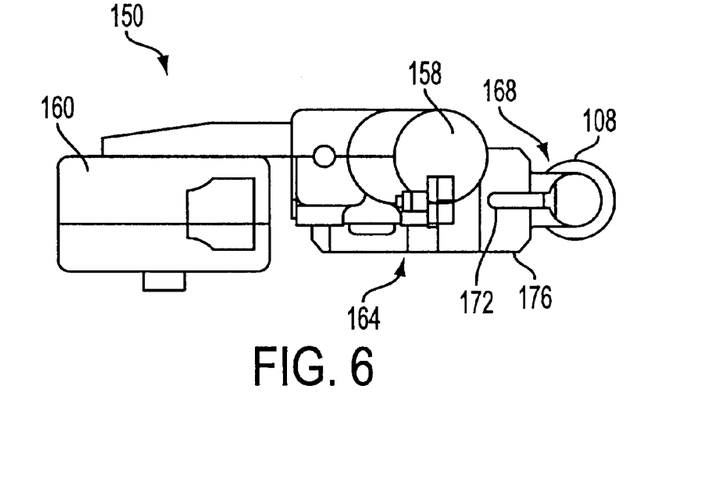
FIG. 6 is a top view of the apparatus of FIG. 5.

FIG. 6 is a top view of the apparatus 150 of FIG. 5 showing the rotational drive assembly 164 and the latching mechanism 168 inserted in the replacement tube 108.

Figure 7:
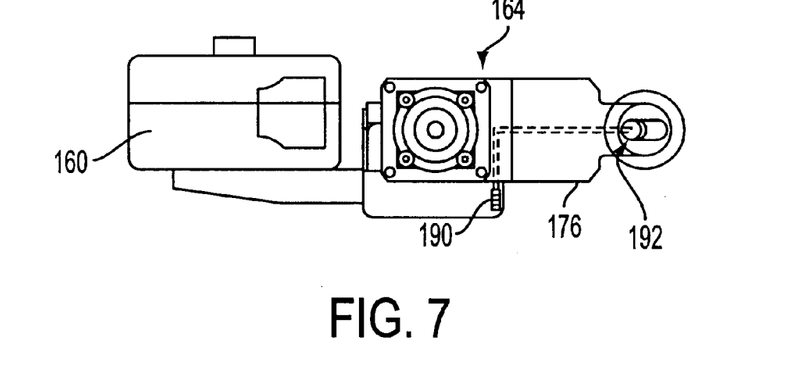
FIG. 7 is a bottom view of the apparatus of FIG. 5.

FIG. 7 is a bottom view of the apparatus 150 of FIG. 5 showing the gas inlet 190 and a rotatable coupling 192 for supplying shield gas to the rotatable torch assembly 152.

Figure 8:
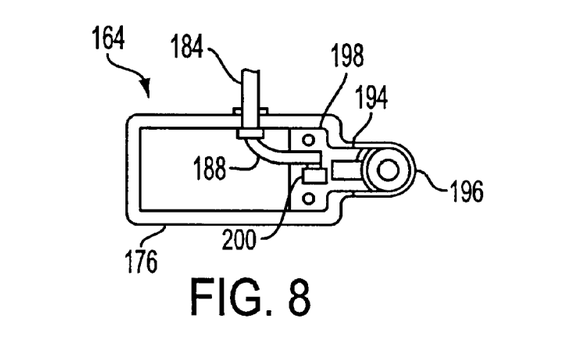
FIG. 8 is a partial sectional view of a rotational drive assembly of the apparatus of FIG.5.

FIG. 8 is a partial sectional view of a rotational drive assembly 164 of the apparatus 150 of FIG. 5 showing the power input terminal 184, lead 188, power brush 194 and a rotating contact ring 196 through which power from welding power supply 186 is electrically coupled to the tip 154 of the rotatable torch assembly 152. Power brush 194 and contact ring 196 are electrically insulated from the housing frame 176 by insulator 198. Spring 200 forces power brush 194 against contact ring 196, thereby ensuring good electrical coupling therebetween.

Figure 9:
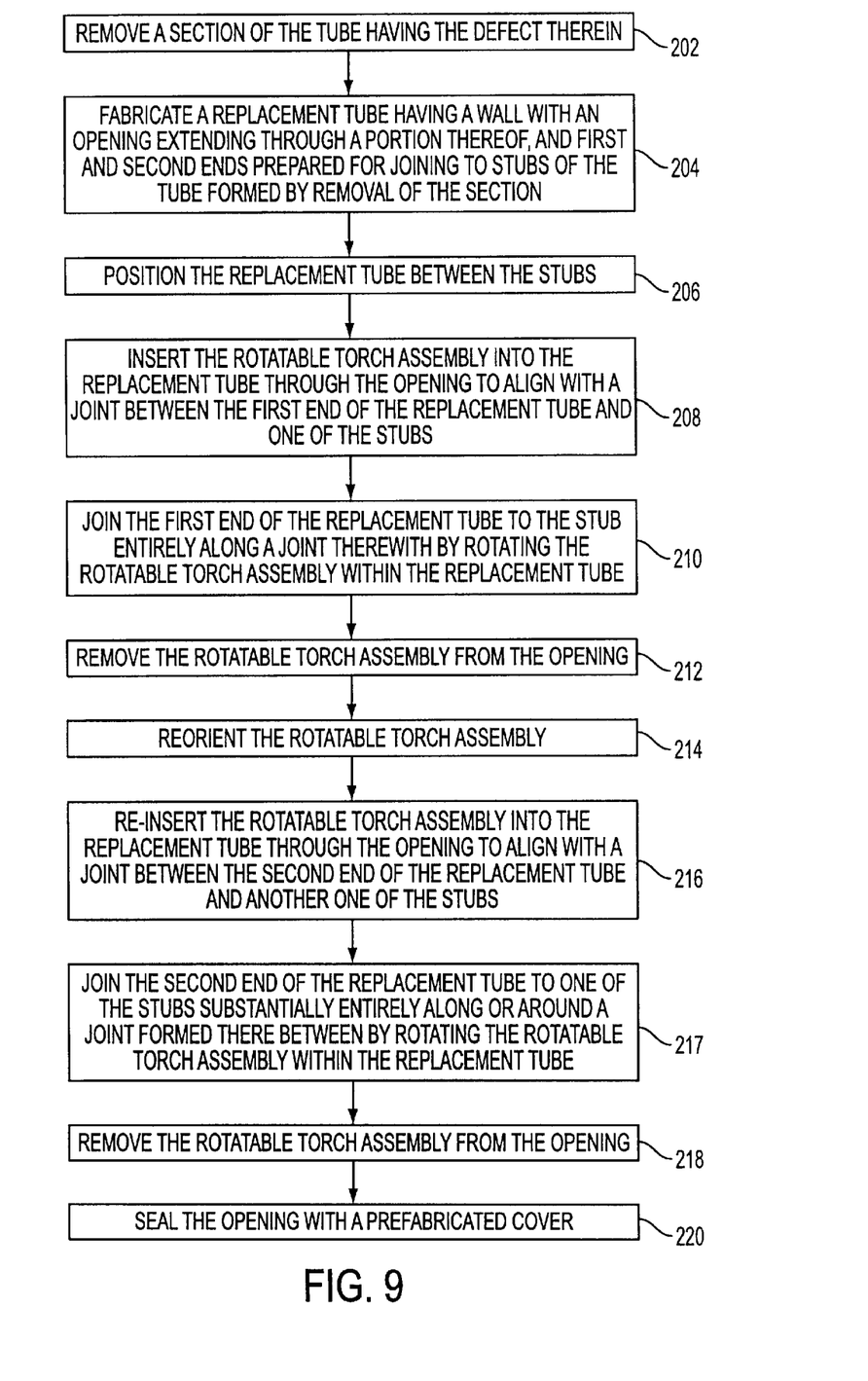
FIG. 9 is a flow chart showing steps of a method for repairing a defect in a tube according to an embodiment of the present invention.

An embodiment of a method for operating the apparatus 150 according to the present invention will now be described with reference to FIG. 9. FIG. 9 is a flow chart showing steps of a method for repairing a defect in a tube 102 according to an embodiment of the present invention. Generally, the method involves: removing a section 110 of the tube 102 having the defect 112 therein (step 202); fabricating a replacement tube 108 having a wall 116 with an opening 114 extending through a portion thereof, and first and second ends 118, 120, prepared for joining to stubs 126, 128, of the tube 102 formed by removal of the section 110 of the tube 102 having the defect 112 therein (step 204); positioning the replacement tube 108 between the stubs 126, 128, of the tube 102 (step 206); (iv) inserting the rotatable torch assembly 152 into the replacement tube 108 through the opening 114, the rotatable torch assembly configured to align with a joint between the first end 118 of the replacement tube 108 and a stub 126 (step 208); and joining the first end 118 of the replacement tube 108 to the stub 126 entirely along a joint therewith by rotating the rotatable torch assembly 152 within the replacement tube 108 (step 210). Preferably, the opening 114 is centrally located between the first and second ends 118, 120, and the method involves the further steps of: removing the rotatable torch assembly 152 from the opening 114 (step 212); reorienting the rotatable torch assembly 152 (step 214); re-inserting the rotatable torch assembly 152 into the replacement tube 108 through the opening 114, the rotatable torch assembly 152 configured to align with a joint between the second end 120 of the replacement tube 108 and another one of the stubs 128 (step 216); and joining the second end 120 of the replacement tube 108 to one of the stubs 128 substantially entirely along or around a joint formed there between by rotating the rotatable torch assembly 152 within the replacement tube (step 217). The repair of the tube 102 is completed by removing the rotatable torch assembly 152 from the opening 114 (step 218), and sealing the opening 114 with a prefabricated cover 138 (step 220). Typically, the cover 138 is welded to the opening.

Optionally, the step of positioning the replacement tube 108 between the stubs 126, 128, of the tube 102, step 204, includes the step of positioning slip rings 140, 142, in sliding engagement with the outer surface 144 of the replacement tube 108 over joints between the ends 118, 120, of the replacement tube 108 and the stubs 126, 128, thereby maintaining alignment of the replacement tube with the stubs while they are joined.

As noted above, the apparatus 150 can be configured to join the replacement tube 108 with the stub, steps 210, 217, by welding. Whichever method is used for joining, preferably, the apparatus 150 further includes a controller 170 for controlling power supplied to the rotatable torch assembly 152, and operating the rotational drive assembly 164, and the steps of joining the replacement tube to the stubs, steps 210, 217, are performed automatically once the tip 154 is aligned with a joint.

It is to be understood that even though numerous characteristics and advantages of certain embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method of repairing a defect in a tube using an apparatus including a rotatable torch assembly, a wire feeder for supplying wire to the rotatable torch assembly, and a rotational drive assembly for supporting and rotating the rotatable torch assembly, the method comprising steps of:
    removing a section of the tube having the defect therein;
    providing a replacement tube having a wall, an opening extending through a portion of the wall, at least one slip ring in sliding engagement with an outer surface of the wall, and a first end and a second end prepared for joining to stubs of the tube formed by removal of the section of the tube having the defect therein;
    positioning the replacement tube between the stubs of the tube;
    positioning the slip ring over a joint between the one of the first and second ends and one of the stubs to maintain the replacement tube in alignment with the stub while the replacement tube is joined to the stub of the tube;
    inserting the rotatable torch assembly into the replacement tube through the opening, the rotatable torch assembly configured to align with a joint between the first end of the replacement tube and one of the stubs; and
    joining the first end of the replacement tube to one of the stubs substantially entirely along a joint therewith by rotating the rotatable torch assembly within the replacement tube.

2. A method according to claim 1, wherein the step of fabricating a replacement tube comprises the step of prefabricating a replacement tube having a first end and a second end separated by a predetermined length.

3. A method according to claim 2, wherein the step of removing a section of the tube having the defect therein comprises the step of removing a length of the tube substantially equal to the predetermined length of the prefabricated replacement tube.

4. A method according to claim 2, wherein the opening extending through a portion of the wall of the replacement tube is centrally located between the first end and the second end, and wherein the method further comprises the steps of:
    removing the rotatable torch assembly from the opening;
    reorienting the rotatable torch assembly;
    re-inserting the rotatable torch assembly into the replacement tube through the opening, the rotatable torch assembly configured to align with a joint between the second end of the replacement tube and one of the stubs; and
    joining the second end of the replacement tube to one of the stubs substantially entirely along a joint therewith by rotating the rotatable torch assembly within the replacement tube.

5. A method according to claim 4, further comprising the steps of:
    removing the rotatable torch assembly from the opening; and
    sealing the opening with a prefabricated cover to complete repair of the tube.

6. A method according to claim 5, wherein the step of sealing the opening with a prefabricated cover comprises the step of welding the prefabricated cover to the opening.

7. A method according to claim 1, wherein the step of joining the first end of the replacement tube to one of the stubs comprises the step of welding the first end of the replacement tube to one of the stubs using the rotatable torch assembly.

8. A method according to claim 7, wherein the apparatus is a Gas Metal Arc Welding apparatus (GMAW), and wherein the step of welding the first end of the replacement tube to one of the stubs comprises the step of providing a shield gas to the rotatable torch assembly through a rotatable coupling in the rotational drive assembly.

9. A method according to claim 7, wherein the apparatus is a Gas Tungsten Arc Welding apparatus (GTAW), and wherein the step of welding the first end of the replacement tube to one of the stubs comprises the step of providing a shield gas to the rotatable torch assembly through a rotatable coupling in the rotational drive assembly.

10. A method according to claim 1, wherein the apparatus further comprises a controller for controlling power supplied to the rotatable torch assembly, and operating the rotational drive assembly, and wherein the step of joining the first end of the replacement tube to one of the stubs comprises the step of controlling power supplied to the rotatable torch assembly and operating the rotational drive assembly to substantially eliminate a build up of material at the joint between the first end of the replacement tube and one of the stubs of the tube,
    whereby restriction in fluid flow through the tube and corrosion of the joint after the tube has been repaired is reduced.

11. A tube repaired according to the method of claim 1.

12. An apparatus for joining first and second ends of a replacement tube to stubs of a tube from which a section of the tube having a defect therein has been removed, the apparatus comprising:
    a rotatable torch assembly adapted to be inserted into the replacement tube through first and second windows in a wall of the replacement tube, to join the first and second ends of the replacement tube to the stubs of the tube;
    a wire feeder having a wire drive assembly to feed wire to the rotatable torch assembly, and a wire supply to supply wire to the wire drive assembly;
    a rotational drive assembly supporting the rotatable torch assembly, the rotational drive assembly capable of rotating the rotatable torch assembly within the replacement tube to join the first and second ends of the replacement tube to the stubs substantially entirely along joints therewith;

wherein the first and second windows are separated from and do not intersect the first and second ends of the replacement tube, and the rotatable torch assembly is further adapted when inserted through the first window to align with the joint between the first end of the replacement tube and one of the stubs, and when removed from the replacement tube, reoriented, and inserted through the second window to align with the joint between the second end of the replacement tube and one of the stubs.

13. An apparatus according to claim 12, wherein the rotatable torch assembly is adapted to weld the first and second ends of the replacement tube to the stubs.

14. An apparatus according to claim 13, wherein the apparatus is a gas metal arc welding apparatus (GMAW), and wherein the rotational drive assembly further comprises a rotatable coupling through which shield gas is supplied to the rotatable torch assembly.

15. An apparatus according to claim 13, wherein the apparatus is a Gas Tungsten Arc Welding apparatus (GTAW), and wherein the rotational drive assembly further comprises a rotatable coupling through which shield gas is supplied to the rotatable torch assembly.

16. An apparatus according to claim 13, wherein the rotational drive assembly is adapted to rotate the rotatable torch assembly at a predetermined rate based on power supplied to the rotatable torch assembly and materials of the wire, the replacement tube, and the tube.

17. An apparatus according to claim 16, further comprising a controller for automatically supplying power to the rotatable torch assembly, and operating the rotational drive assembly, whereby a build up of material at joints between the first and second ends of the replacement tube and the stubs of the tube is substantially eliminated, and restriction in fluid flow through the tube and corrosion of the joints after the tube has been repaired is reduced.

18. An apparatus according to claim 12, further comprising:

a mount to which the rotational drive assembly and the wire feeder are attached; and a latching mechanism for holding the mount to position the rotatable torch assembly within the replacement tube.

19. An apparatus according to claim 18, wherein the latching mechanism is adapted to be partially inserted into the window in the replacement tube.

20. A prefabricated replacement tube for use in repairing a tube having a defect, the replacement tube comprising:

a wall;

first and second ends separated by a predetermined length, the ends prepared for joining to stubs of the tube from which a section of the tube having the defect therein has been removed;

a central opening extending through a portion of the wall, the central opening located between the ends, and adapted to enable a rotatable torch to be inserted into the replacement tube through the central opening to join the first and second ends of the replacement tube to the stubs of the tube; and at least one slip ring in sliding engagement with an outer surface of the wall, the slip ring adapted to be positioned over a joint between the one of the first and second ends and one of the stubs to maintain the replacement tube in alignment with the stub while the replacement tube is joined to the stub of the tube.

21. A prefabricated replacement tube according to claim 20, wherein the central opening is adapted to enable a rotatable torch of an automated gas metal arc welding apparatus (GMAW) to be inserted into the replacement tube to weld the first and second ends of the replacement tube to the stubs of the tube substantially without a build up of material at joints between the first and second ends of the replacement tube and the stubs of the tube, whereby restriction in fluid flow through the tube and corrosion of the joints after the tube has been repaired is reduced.

22. A prefabricated replacement tube according to claim 20, wherein the central opening is adapted to enable an automated welding apparatus to weld a prefabricated cover over the central opening completing repair of the tube.

23. A prefabricated replacement tube for use in repairing a tube having a defect, the replacement tube comprising:

a wall;

first and second ends prepared for joining to stubs of the tube from which a section of the tube having the defect therein has been removed;

a plurality of openings extending through portions of the wall, the plurality of openings including:

a first opening located a predetermined distance from the first end of the replacement tube and through which a rotatable torch assembly can be inserted into the replacement tube to join the first end of the replacement tube to one of the stubs; and a second opening located the same predetermined distance from the second end of the replacement tube and through which the rotatable torch assembly can be inserted into the replacement tube to join the second end of the replacement tube to one of the stubs; and wherein each of the plurality of openings are separated from and do not intersect the first and second ends.

24. A prefabricated replacement tube according to claim 23, wherein the first and second openings are adapted to enable a rotatable torch of an automated gas metal arc welding apparatus (GMAW) to be inserted into the replacement tube to weld the first and second ends of the replacement tube to the stubs of the tube substantially without a build up of material at joints between the first and second ends of the replacement tube and the stubs of the tube, whereby restriction in fluid flow through the tube and corrosion of the joints after the tube has been repaired is reduced.

25. A prefabricated replacement tube according to claim 23, wherein the plurality of openings are adapted to enable an automated welding apparatus to weld a prefabricated cover over each of the plurality of openings completing repair of the tube.

26. A prefabricated replacement tube according to claim 23, further comprising at least one slip ring in sliding engagement with an outer surface of the wall, the slip ring adapted to be positioned over a joint between the one of the first and second ends and one of the stubs, whereby the replacement tube is maintained in alignment with the stub while the replacement tube is joined to the stub of the tube.

27. A prefabricated replacement tube for use in repairing a tube having a defect, the replacement tube comprising:

a wall;

first and second ends prepared for joining to stubs of the tube from which a section of the tube having the defect therein has been removed;

at least one opening extending through a portion of the wall, and through which a rotatable torch assembly can be inserted into the replacement tube to join first and second ends of the replacement tube to the stubs; and at least one slip ring in sliding engagement with an outer surface of the wall, the slip ring adapted to be positioned over a joint between the one of the first and second ends and one of the stubs, whereby the replacement tube is maintained in alignment with the stub while the replacement tube is joined to the stub of the tube.

28. A prefabricated replacement tube according to claim 27, wherein the at least one opening is adapted to enable a rotatable torch of an automated gas metal arc welding apparatus (GMAW) to be inserted into the replacement tube to weld the first and second ends of the replacement tube to the stubs of the tube substantially without a build up of material at joints between the first and second ends of the replacement tube and the stubs of the tube, whereby restriction in fluid flow through the tube and corrosion of the joints after the tube has been repaired is reduced.

29. A prefabricated replacement tube according to claim 27, wherein the at least one opening is adapted to enable an automated welding apparatus to weld a prefabricated cover over the at least one opening completing repair of the tube.

30. A method of repairing a defect in a tube using an apparatus including a rotatable torch assembly, a wire feeder for supplying wire to the rotatable torch assembly, and a rotational drive assembly for supporting and rotating the rotatable torch assembly, the method comprising steps of:

removing a section of the tube having the defect therein;

providing a replacement tube having first and second ends prepared for joining to stubs of the tube formed by removal of the section of the tube having the defect therein, a wall, a plurality of openings extending through portions of the wall, the plurality of openings including a first opening located a predetermined distance from the first end of the replacement tube and through which the rotatable torch assembly can be inserted into the replacement tube to join the first end of the replacement tube to one of the stubs, and a second opening located the same predetermined distance from the second end of the replacement tube and through which the rotatable torch assembly can be inserted into the replacement tube to join the second end of the replacement tube to one of the stubs, and wherein first and second openings are separated from and do not intersect the first and second ends;

positioning the replacement tube between the stubs of the tube;

inserting the rotatable torch assembly into the replacement tube through the opening, the rotatable torch assembly configured to align with a joint between the first end of the replacement tube and one of the stubs; and joining the first end of the replacement tube to one of the stubs substantially entirely along a joint therewith by rotating the rotatable torch assembly within the replacement tube.

* * * * *